(No Model.)
O. PECK.
BIT STOCK.
No. 246,904. Patented Sept. 13, 1881.
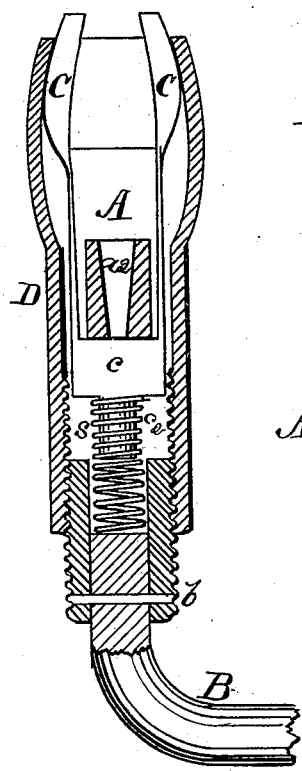
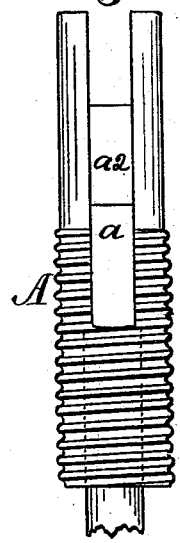
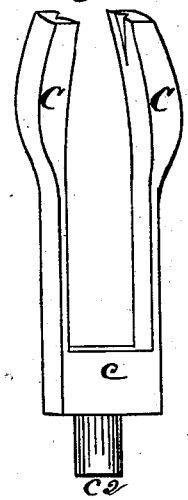
Witness:
Frank W. Tibbitts.
Chas. D. O'Connor
Inventor:
Obed Peck.
By Geo. W. Tibbitts att'y

UNITED STATES PATENT OFFICE.

OBED PECK, OF ROWE, MASSACHUSETTS.

BIT-STOCK.

SPECIFICATION forming part of Letters Patent No. 246,904, dated September 13, 1881.

Application filed April 8, 1881. (No model.)

*To all whom it may concern:*

Be it known that I, OBED PECK, of Rowe, in the county of Franklin and State of Massachusetts, have invented a certain new and useful Improvement in Bit-Braces, which improvement is fully set forth in the following specification and accompanying drawings, in which—

Figure 1 is a side elevation. Fig. 2 is a longitudinal section. Fig. 3 shows, in perspective detached, the spring-jaws. Fig. 4 is a view of the slotted core of the bit-stock.

In the drawings the tool-holding portion of a bit-stock is shown only.

A represents the core or center part of the tool-holder, secured to the end of the sweep B by a pin, $b$. The said core A is divided centrally by a slot, $a$, about two-thirds of its length, while the balance is bored for fitting it onto the said sweep, and for another purpose hereinafter shown. The divided part of said core is strengthened by a partition, $a^2$, located about midway from the outer end to the bore. The lower outside half of said core is also provided with a screw-thread.

C C are spring-jaws, formed of one piece by being united at their lower end by a cross-head, $c$, to which is also made a pin, $c^2$. The said jaws from their open end are made with a swell downward, to give them a taper, and have at the open end inside indentations for griping the angular sides of a tool-shank. The spring-jaws are located in the slot $a$ of the aforesaid core A, as will be seen by reference to Fig. 2, embracing the said partition $a^2$, and having the pin $c^2$, accompanied with a spiral spring, $s$, to play in the before-mentioned bore.

D is an outside shell or casing, which fits over and incloses the above-described core A and spring-jaws C C. The lower inside portion of said shell is screw-threaded to fit over the screw portion of the said core, and upon which and by which the said shell is made to traverse when turned, for closing the gripe of the jaws onto the tool. The forward end of the said shell is made with a curved enlargement, which is hollowed out to fit over the swell portion of the jaws C C, the obvious purpose of which is to contract the jaws whenever the said shell shall be screwed down, and to permit the spreading of the jaws when screwed outward again.

To insert my united spring-jaws in the slotted core one of the jaws is first put through the slot below the partition, and then the jaws are turned up in their proper position. The pin or tang can be dropped into the core. The spring is put in through the bottom end of the core before it is placed onto the sweep B.

The operation of the foregoing is as follows: The shank of the tool is inserted between the jaws, the small end of said shank entering the tapering hollow space in the partition $a^2$; then by screwing down the shell the jaws gripe the tool, and it is held firmly in a perfectly direct line in the center of the stock.

It will be noticed the jaws have a self-adjusting movement through the means of the spiral spring $s$. This gives the jaws a very ready adjustment to the different sizes and lengths of tool-shanks. This makes a compact and simple self-adjusting bit-stock having few parts, not liable to become misplaced or get out of order.

Having described my invention, I claim—

In a self-adjusting bit-stock, the slotted, screw-threaded, and bored core A, having the partition $a^2$, the united jaws C C, having the pin $c^2$, provided with spiral spring $s$, playing in said bore, and the shell D, having the swelled outer end and the inside screw-thread, the said parts being constructed, combined, and operating substantially as shown and described.

OBED PECK.

Witnesses:
BENJAMIN BILES,
J. C. CAMPBELL.